July 16, 1935.  K. D. LOOSE  2,008,024
CEREAL FOOD PRODUCTS
Filed March 27, 1933

Kenneth D. Loose, INVENTOR.

ATTORNEYS.

Patented July 16, 1935

2,008,024

UNITED STATES PATENT OFFICE 2,008,024

CEREAL FOOD PRODUCTS

Kenneth D. Loose, Bronxville, N. Y., assignor to Loose-Wiles Biscuit Company, Long Island City, N. Y., a corporation of New York Application March 27, 1933, Serial No. 662,909

13 Claims. (Cl. 99—10)

This invention is a new article and method. In its preferred form the article consists of a cereal biscuit or wafer made of whole wheat and of such structure as to possess a high degree of friability making it easily chewed even when dry, but yet of sufficient firmness to maintain its integrity when packaged for commercial use, and being adapted to serve either as a breakfast cereal or as a wafer or cracker, or to take the place of toast.

Figure 1:
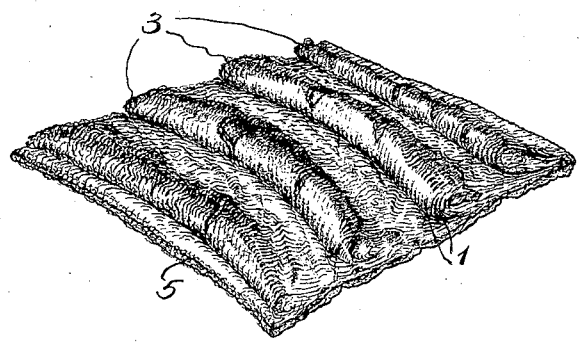
Figure 2:
Figure 3:
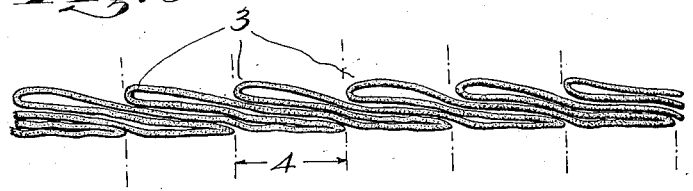
Figure 4:
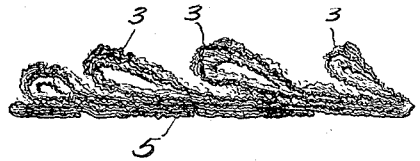
Figure 5:
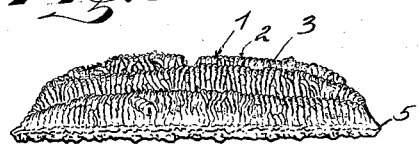

In the accompanying drawing, Fig. 1 shows the new article in preferred form in somewhat schematic perspective because, due to variations and irregularities incident to baking, the biscuit is difficult to render with pen and ink, no two being exactly alike. Fig. 2 shows in a much enlarged scale a cross-section of the thin dough sheet, of which the biscuit is made. Fig. 3 illustrates the preferred system of folding such dough sheet in the manufacture of the biscuit. Fig. 4 may be termed a characteristic cross section taken crosswise of the ridges or folds and Fig. 5, an end view.

The process of manufacture may be as follows: A mass of wheat berries having been first cleaned of dirt, and steamed or boiled, and surface dried, is put through a so-called shredder or reducer to convert it into the form of a continuous, thin, ribbed sheet of any suitable width, preferably several times the width of the individual biscuits to be made therefrom. The reducing machine comprises a pair of parallel cylindrical rolls, one of which is formed with circumferential and preferably continuous scorings or fine grooves, being substantially the same as disclosed in Patent No. 502,378, now well known in the art, except that the two cylinders are spaced apart a few thousandths of an inch and do not roll in mutual contact as the case in the use of that machine. In consequence of this adjustment the whole-wheat now in the form of dough is delivered as an extremely thin sheet composed of fine parallel projections or ribs, united by intervening more or less continuous webs. The thinness of this sheet is an important factor in the quality of the product. In cross section, as shown in Fig. 2, the ribs, marked 1, conform of course to the shape and size of the grooves in the grooved cylinder in which they were made and those grooves are preferably of the order of about .020 inch in width and about .022 inch deep. The webs, marked 2, may be of the same width or preferably somewhat wider, say about .030 inch wide, or in some cases, they may be still wider, up to say .150 inch. By comparison with the dimensions of the ribs they will be seen to be extremely thin, resulting from the close spacing of the cylinders. There is no limitation however to the particular dimensions just given nor to the described method of producing the thin dough sheet, but it is desirable that the ribs shall be very slender and that the webs shall be extremely thin, so thin in fact as to be translucent, and not any thicker than the particular batch of dough will permit while yet retaining the web function of holding the ribs together during further manufacture as well as after baking. Due to the fact that a dough of whole wheat contains bran particles and is therefore not of thoroughly uniform consistency, both the ribs and webs present fine irregularities or roughnesses which are more particularly apparent after baking, as will be understood by those familiar with this art.

Such a dough sheet having a ribbed formation or in any event a sectional contour which is uneven or serrated in some manner, is delivered onto any suitable support, as for instance on a travelling belt, and is laid thereon in superposed layers and preferably as continuous overlapping folds 3, about as indicated by the diagram of Fig. 3, thereby producing a desirable and new effect in the texture of the biscuit as will be presently explained more in detail. It will be understood that Fig. 3 is a diagram, merely; it does not attempt to represent the thickness of the sheet which is very thin as stated.

Taking the intervals between foldings as the unit of spacing (marked by dotted lines 4), the sheet is preferably folded about three spaces forward and two spaces backwards, which gives at least three layers of dough sheet at the thinnest part, indicated for example at any of the dotted lines 4 in Fig. 3. The order of folding can be increased, if desired, making five, seven or more layers at the lines 4, according to the extent of backward folding, thus resulting in a thicker or heavier biscuit; but the order of about three and two is satisfactory, and it cannot well be less because in such case there would be only one layer at the lines 4 which would be insufficient in point of strength, the layer being so thin. Such a folded dough sheet, as above described, can be made continuously in various ways as for example by utilizing the general principle of construction disclosed in Patent No. 618,288.

The folded sheet is next cut into squares or other sections by the use of any suitable cutting mechanism, such as used for example for cutting crackers, taking care however not to press unduly upon the top surface of the folded dough sheet so as to flatten the biscuit when making the cut.

The loops of the folds of a dough sheet as thin as that herein contemplated are stiff enough to support their own weight and remain open after folding for some period. Each biscuit thus formed and which may be, say about two and one-half inches square, includes several, preferably three or more folds, the tops of which extend as parallel ridges or ruffles across the top of the biscuit.

Immediately on being cut, the biscuits are passed into a high temperature oven, having ordinarily a temperature of say 450° F. where they remain for a few minutes, long enough to set the dough by driving off the excess moisture in it and if desired, browning or crisping the top, whereupon they are next passed to an oven of lower temperature or left in the open air until they are sufficiently desiccated. They are then ready for packaging.

The novel texture above referred to results from the fact that in the process of folding, the lower portions of the folds, indicated generally by 5, are brought into more or less continuous though superficial contact with each other, as they are laid one on the other, due to the weight of the upper layers and possibly to some extent also to the slight marginal compression incident to the cutting, while the several upper portions are not so much in contact but have more or less the form of open loops. The effect is that when the biscuits are subjected to the high setting heat, the layers constituting the lower portions of the folds become lightly bonded or welded together at their numerous points of contact with each other, the connection being rather a multiple point union than a surface union and with numerous small voids or open spaces between them. Apparently the welded contacts are only with the tops of the ribs. Thus united the layers of the lower loop portions form a continuous, highly porous or lacey and therefore tender base for the finished article and which being at least three layers thick, as already mentioned, is sufficiently firm to hold the biscuit together under all normal conditions. The upper parts of the loops or the tops of the folds, being under no such pressure as the bottom portions, maintain their general open formation and have no points of contact to be bonded, except where they merge into the base. The heat expands and more or less distorts all parts of the biscuit and particularly these upper portions, curling them up one way or another and more or less irregularly, producing or preserving the open spaces within and between and often beneath them and giving the biscuit in general a rough or shaggy but delicate appearance as attempted to be indicated in the drawing. It may be noted that the spaces between the ridges form pockets which are useful to receive butter when the article is used to take the place of toast. In Fig. 1 the ribs are to be understood as running lengthwise of the ribbon, crosswise of the folds.

The new biscuit can thus properly be regarded as comprised of a foundation part represented by plural layers bonded together at frequent points of contact, and merging into a superstructure part represented also by plural layers of dough sheet having no or only few bonded contacts, the texture of the biscuit being thus denser at the bottom and less dense at the top. In this way the new biscuit obtains unusual delicacy along with adequate stability to withstand packaging and ordinary handling without breaking up. It is suitable to be eaten dry, since the thinness of the dough sheet makes it sufficiently tender for that purpose and the effect of the denser foundation is to allow it to be bitten into without collapsing.

During the course of baking, the webs 2 shrink and some of them break down or disappear, either from the effect of the escaping steam or due to the warping and curling of the thicker ribs as they are dried or baked. This produces many gaps here and there in the continuity of the folded sheet, which add to the general flakiness and lacey character of the structure, but a sufficient junction between adjacent ribs or filaments nevertheless remains after baking.

While the new article has been above described as made of whole wheat and I prefer to use only whole wheat, it may nevertheless be possible to produce somewhat of the same characteristic structure and effect with combinations of wheat and other forms of cereal or food material, and in so far as the same effect can be substantially produced in this way, the intention is to include such alternate methods and forms within the scope of this patent, together with all such variant forms or systems of folding or arranging the layers of the thin, filamentous, corrugated, uneven or irregular sectioned dough sheet so as to produce a biscuit having a firm substantially continuous and highly porous foundation part merging into a lighter and even less dense or more open upper part, as above described.

I claim:

1. A cereal biscuit formed of layers of thin dough sheet of irregular section, said layers being assembled so that they are in contact at separated points with intervening voids and being welded to each other at such points, said welded points occurring most frequently in the lower part of the biscuit and constituting the so-united layers in such lower part into a base or foundation adequate to hold the material in biscuit shape, while the parts of said layers which are least or not at all welded to each other occur mainly in the upper part of the biscuit and form ridges or projections standing off from the more closely welded foundation.

2. A cereal biscuit comprising a relatively dense but porous foundation part and a superstructure of more open texture, the foundation part being constituted of contacting irregular layers of filamentous dough sheet welded together at the various points where they contact and said superstructure being composed of portions of such filamentous dough standing off as ridges from said foundation part and crisped by heat.

3. A cereal biscuit formed of superposed layers of thin dough sheet composed of fine projections or ribs with thin intervening connecting webs so thin as to be translucent, said layers being assembled so that they are in multiple-point contact with each other and welded to each other at such points, said points of welded contact occurring most frequently in the lower part of the biscuit and constituting the so-united layers in that part as a supporting foundation for the biscuit and the non-contacting portions of said layers occurring mainly in the upper part of the biscuit.

4. A cereal biscuit comprising a foundation part composed of superposed contacting layers of thin dough sheet, said dough sheet having uneven sectional contour and said layers thereof being welded together at the points where they are in contact, and a superstructure composed of open, imbricated folds of such dough sheet giving a ruffled appearance to the biscuit.

5. A cereal biscuit composed of a foundation comprising superposed layers of thin dough sheet, said dough sheet being composed of fine projections or ribs connected by webs so thin as to be translucent and the layers thereof in said foundation part being welded together where they mutually contact thus forming a foundation of at least three layers of such sheet and a superstructure composed of ridges or projections of such thin dough sheet carried by said foundation.

6. A cereal biscuit composed of layers of thin dough sheet, said dough sheet being composed of fine ribs or projections connected by webs so thin as to be translucent and the layers thereof being welded together where they mutually contact to form the foundation part of the biscuit and the rest of the biscuit being composed of a group of overlapping parallel open folds or loops of said thin dough sheet.

7. A cereal biscuit composed of thin sheet or ribbon of dough, the same being constituted of fine projections or ribs united by thin translucent connecting webs, and being folded back and forth on itself to form a group of parallel folds or ruffles extending across the top of the biscuit, the several layers constituting said folds being welded together at spaced apart points where they are in contact.

8. A cereal biscuit made of thin dough ribbon composed of fine projections or ribs united by thin connecting webs, said ribbon being folded back and forth on itself, the lower parts of the folds being united, forming a foundation at least three layers deep and the upper parts being free, open and crisped by heat.

9. A cereal biscuit formed of thin dough sheet folded back and forth on itself, the folding being in the order of at least three spaces forward and two backward, the lower parts of the folds being in contact and welded together at points and the upper parts of the folds being crisped by heat to stand away from the lower part.

10. The method of making cereal biscuits which comprises zigzag-folding a thin sheet of dough at least three spaces forward and two spaces back, cutting biscuits out of such sheet so that several folds are included in each biscuit and expanding and crisping the tops of the folds by baking the biscuits.

11. The method of making cereal biscuits which comprises first making a thin dough-sheet comprised of fine ribs and thin connecting webs, superposing layers of such sheet to produce folds thereof on the top surface and cutting biscuits out of such folded material with a plurality of folds in each biscuit and expanding and crisping the folds by baking.

12. A cereal biscuit composed of thin layers of filamentous dough folded back and forth on itself to form parallel folds or ruffles extending across the top of the biscuit, the portions of the layers constituting the lower parts of the folds being welded together at points to form a porous foundation for the biscuit.

13. A cereal biscuit composed of thin layers of filamentous wheat dough containing the bran or bran-like particles, said layers consisting of fine projections or ribs and thin intervening connecting webs and superposed on each other to form a substantially flat foundation for the biscuit and a group of parallel folds or ridges extending across the top of such foundation, the layers in said foundation part being welded to each other but only at separate points where they contact, and the portions which form the loops or ridges being free or open and crisped by heat so as to stand away from said foundation part.

KENNETH D. LOOSE.